United States Patent [19] [11] 4,031,788
Boge et al. [45] June 28, 1977

[54] CHOP SAW

[76] Inventors: Dallas F. Boge, 7145 SW. Sylvan Court, Portland, Oreg. 97225; Roderick Olsen, Jr., 13500 SW. Hazel, Beaverton, Oreg. 97005

[22] Filed: Oct. 1, 1975

[21] Appl. No.: 618,699

Related U.S. Application Data

[62] Division of Ser. No. 556,796, March 10, 1975.

[52] U.S. Cl. .................................. 83/380; 83/390; 83/460; 83/465; 83/490
[51] Int. Cl.² ......................................... B27B 7/00
[58] Field of Search ............ 83/282, 380, 390, 460, 83/461, 465, 466.1, 490; 269/145, 237, 238, 239

[56] References Cited
UNITED STATES PATENTS

| 606,051 | 6/1898 | Cunningham | 83/465 X |
| 1,488,073 | 3/1924 | Smith | 83/465 X |
| 1,842,573 | 1/1932 | Treek | 83/466.1 X |
| 2,353,590 | 7/1944 | Schutz | 83/390 |
| 2,360,070 | 10/1944 | Meyerbach | 83/490 X |
| 2,365,987 | 12/1944 | Zimmerman | 83/380 |
| 2,679,177 | 5/1954 | Gepfert | 269/145 X |
| 2,693,057 | 11/1954 | Eastwood | 83/490X |
| 3,625,102 | 12/1971 | Shiino | 83/460 |
| 3,851,557 | 12/1974 | Vierstraete | 83/461 X |

Primary Examiner—Frank T. Yost

[57] ABSTRACT

A chop saw for selectively cutting logs to various lengths includes a motor-driven circular saw blade mounted at the outer end of a saw carriage pivoted to a fixed base. A rotary crank mechanism driven by a hydraulic motor on the carriage oscillates the carriage about its pivot to feed the saw blade into and out of a log held in cutting position alongside the carriage by hydraulic cylinder-operated clamp arms which are also mounted on the fixed base. A crankshaft of the rotary crank mechanism carries a cam which operates a hydraulic flow control valve in the hydraulic circuit of the carriage drive motor to reduce the speed of the motor and thus carriage travel only when the saw blade cuts through the log. Limit switches in an electrical control circuit and operated by cams on the crankshaft control the operation of valves in hydraulic circuits for the clamp cylinders and carriage drive motor to coordinate the positions of the carriage with the closing and opening of the clamp arms.

10 Claims, 5 Drawing Figures

CHOP SAW

This is a division of application Ser. No. 556,796 filed Mar. 10, 1975.

BACKGROUND OF THE INVENTION

1. Field of the Invention

The present invention relates to a chop saw for selectively cutting logs and other elongate, generally cylindrical workpieces to various lengths for further processing.

2. Description of the Prior Art

Known chop saws of the type described are large and heavy, having circular saw blades six feet or more in diameter capable of cross-cutting large logs of several feet or more in diameter. Chop saws of this size and type have commonly included a pivoted saw carriage oscillated by double-acting hydraulic cylinders to move the saw blade to and from the workpiece. However, in at least one case a rotating crank mechanism has been used to oscillate the saw carriage. Typically the speed of travel of the carriage during a cutting cycle is relatively constant whether oscillated by hydraulic cylinder or crank. Thus the carriage must be moved at a sufficiently slow speed to prevent overloading the saw motor as the saw cuts through a workpiece. However, because a considerable portion of the carriage travel occurs while the saw is not cutting, the overall cycling speed of constant-speed carriages is slow. Since the chop saw is usually positioned at the upstream end of a processing or production line of a mill or other processing plant, the cycling speed of the chop saw can determine or at least affect the production rate of the entire mill or plant. Thus it is advantageous to provide a chop saw with as fast a cycling speed as possible within the limits of the load capacity of the saw drive motor.

U.S. Pat. No. 3,715,946 discloses a chop saw of the general type previously described which endeavors to increase the overall cycling speed of the saw carriage by varying the feed speed in response to changes in the torque of the saw drive motor. A double-acting hydraulic cylinder is used to oscillate the saw carriage. The cycling speed control of such patent is complex, requiring feedback of torque signals from the electric saw motor to the hydraulic feed cylinder through sophisticated electrical, mechanical and hydraulic regulating components.

Other known saw devices have sought to vary the stroking speed of a saw by various usually complex means. Two such prior saws are shown in U.S. Pat. Nos. 2,987,085 and 3,213,734, neither of which, however, relate to chop saws of a type suitable for cross-cutting logs or other workpieces of large diameter.

Still another prior patent disclosing an unpowered saw carriage with means for feeding the saw through a workpiece at a variable speed is shown in U.S. Pat. No. 54,046.

SUMMARY OF THE INVENTION

The present invention is an improved chop saw especially adapted for sawing logs into various lengths for further processing in a sawmill, plywood mill or other mill or process plant that uses logs. The chop saw of the present invention is characterized by a pivoted, oscillating saw carriage, the oscillation of which is achieved through a hydraulic motor-driven crank mechanism that provides controlled acceleration and deceleration at the extremities of carriage travel. The rotary crank mechanism includes a cam on a crankshaft controlling the feed speed of the carriage drive motor through a mechanical feedback to the motor via a cam-operated hydraulic flow control valve in the hydraulic circuit of such motor. The cam is profiled to provide a fast motor speed and thus fast carriage travel toward and away from a log but a reduced motor speed and thus slower carriage travel as the saw cuts through a log. In fact, the cam is profiled to cause the saw to cut through a substantially constant cross-sectional area of the log during a given time interval so that the power required to feed the saw through a log remains substantially constant throughout the cutting stroke. A single-acting hydraulic counterbalance cylinder helps support the weight of the carriage frame, thereby reducing the power requirements of the carriage drive motor.

The chop saw also features an integral log clamp including independently operated clamp arms which, during the cutting operation, grip opposite sides of the log through the operation of separate hydraulic motors. Each motor is in a separate hydraulic control circuit including separate solenoid-operated hydraulic control valves. These features provide for independent movement of the opposed clamp arms toward the log and centering of the log in clamped position between the clamp arms.

Another feature of the invention is an electrical control circuit which coordinates operation of the saw carriage and clamp arms. The clamp arms clamp the log in position for cutting before the saw begins its cutting stroke, become locked in their log-clamping positions as the saw cuts through the log and release the log after retraction of the saw blade from the log. Limit switches in the electrical control circuit operated by cams on the crank arm of the saw carriage initiate clamp arm operation and stop carriage travel at the end of each cutting cycle.

A primary object of the invention is to provide an improved chop saw for cutting logs which has a faster cycling speed than prior such saws.

Another important object is to provide an improved chop saw in which the fast operating cycle is achieved by stroking the saw at a fast rate toward and away from the log but at a slower, controlled rate as the saw cuts through the log.

Another primary object is to provide the aforesaid variable speed carriage travel through the use of a simplified mechanical feedback from the saw carriage to the carriage drive motor through a motor speed control operated in response to the position of the carriage with respect to the log or other workpiece.

A more specific yet important object is the control of carriage travel speed through the use of a cam on the crankshaft of a rotary crank mechanism for oscillating the saw carriage to vary the speed setting of a carriage motor speed regulator.

Still another important object is to control the feed speed of the saw during its cutting stroke through the use of a cam as aforesaid, with the cam profiled to casue the saw to cut through a substantially constant area of wood per unit of time to produce a substantially constant power requirement during cutting.

Another object is to minimize the power requirements of the carriage drive motor by use of a fluid counterbalance cylinder to help support the weight of the saw carriage.

Yet another object is to provide an integral chop saw and log clamp with the operation of the log clamp arms being coordinated with the positioning of the saw carriage with respect to the workpiece.

A further object of the invention is to provide an improved log-clamping mechanism in conjunction with the chop saw with such mechanism providing improved log-gripping and -centering characteristics.

The foregoing and other objects, features and advantages of the present invention will become more apparent from the following detailed description, which proceeds with reference to the accompanying drawings.

DETAILED DESCRIPTION

Figure 2:
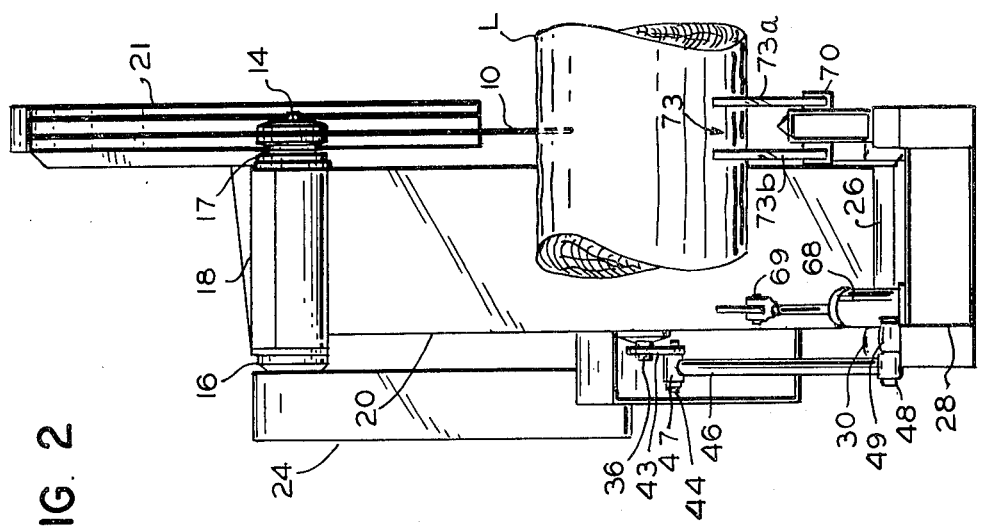
FIG. 2 is a side elevational view of the chop saw and clamping structure of FIG. 1.
Figure 1:
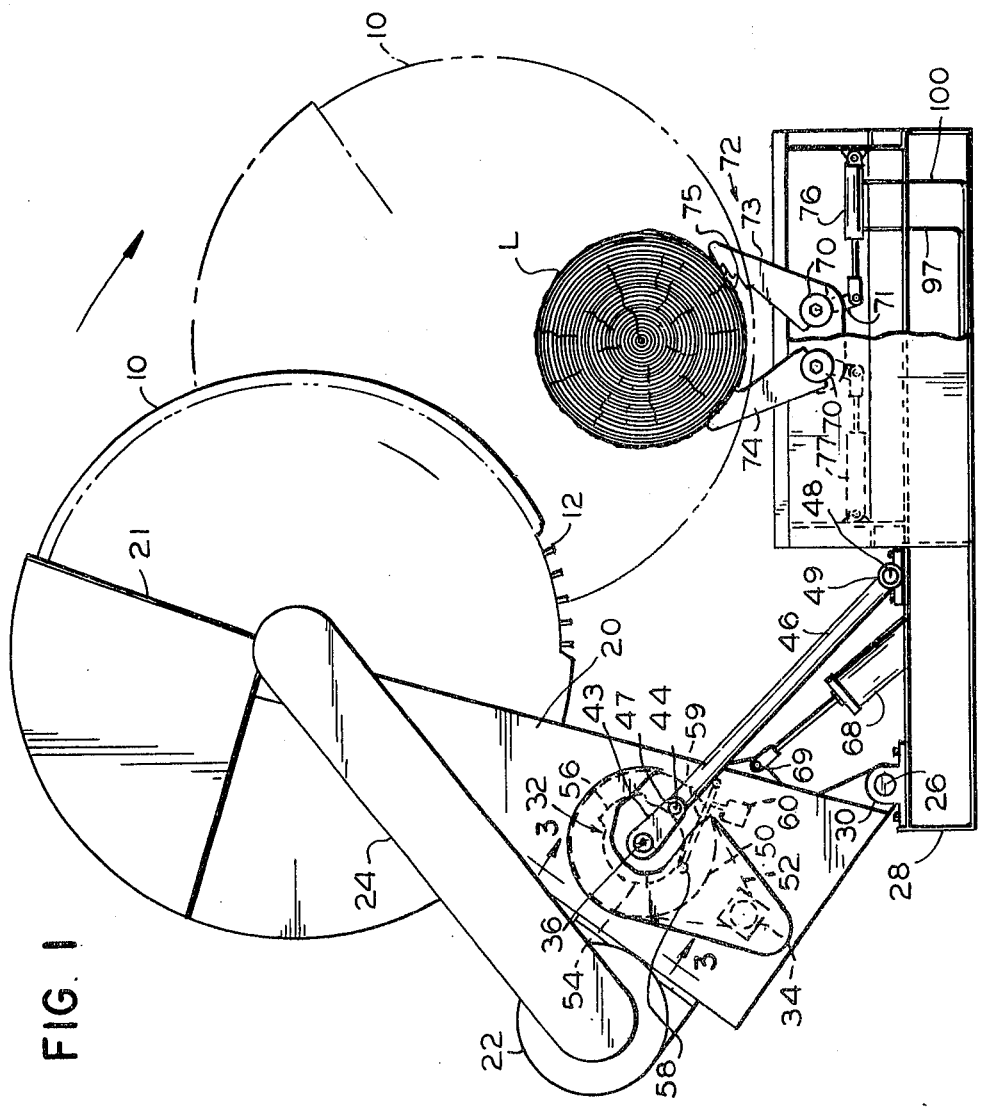
FIG. 1 is a front elevational view of a chop saw and integral log-clamping structure in accordance with the present invention.

With reference first to FIGS. 1 and 2 of the drawings, the chop saw of the invention includes a circular saw blade 10 with teeth 12 evenly spaced along its outer periphery and arranged so that when in contact with a log L, the log is cut perpendicular to its grain. The saw blade is mounted on a mandrel 14 rotatably mounted in suitable mandrel bearings 16, 17 at the opposite ends of a mandrel housing 18 at the outer end of an oscillating saw carriage frame 20. Saw blade 10 is partially shielded by a partially removable saw guard 21 attached to the carriage frame. Carriage frame 20 mounts an electric, hydraulic or air motor 22 for rotating saw blade 10 through an appropriate chain-and-sprocket or belt-and-pulley power transmission train 24.

Saw carriage 20 is pivoted at a lower end corner on a pivot shaft 26 to a fixed base 28 by pivot journal bearings 30 for oscillation about the axis of such shaft.

A carriage drive means for oscillating the saw carriage frame about the axis of shaft 26 includes a rotary crank mechanism indicated generally at 32 driven by a hydraulic carriage drive motor 34 carried by the carriage frame.

Figure 3:
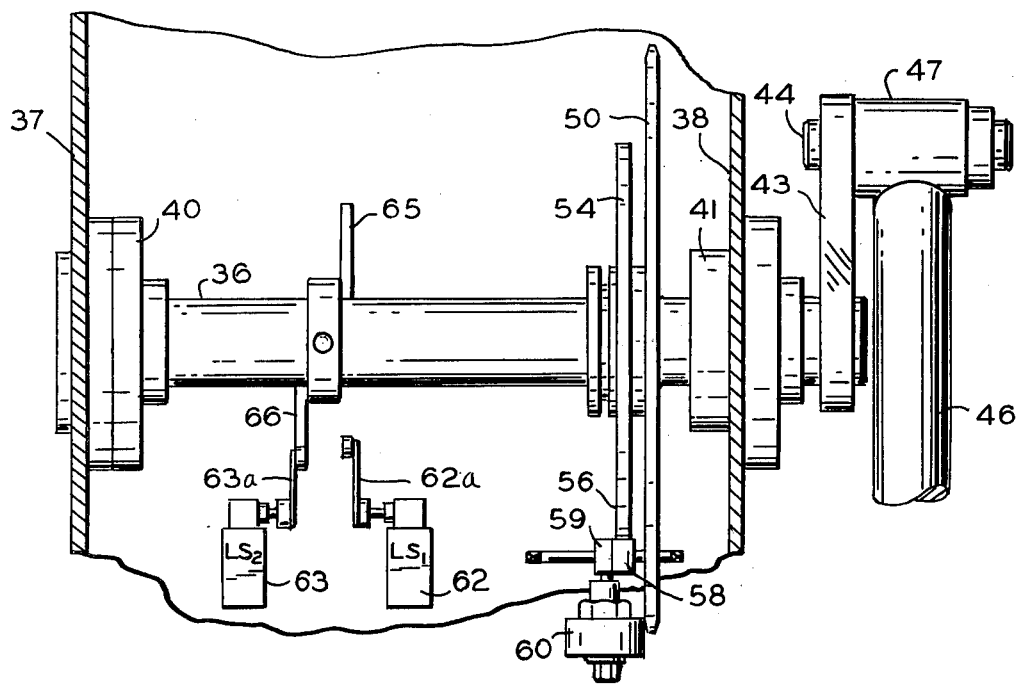
FIG. 3 is an enlarged view of the rotary crank mechanism of the chop saw taken along the line 3—3 of FIG. 1.

Referring to FIGS. 1 and 3, the rotating crank mechanism includes a main crankshaft 36 rotatably mounted crosswise on the carriage frame between frame side plates 37, 38 in journal bearings 40, 41. A crank arm 43 is fixed at one end to an outer end of crankshaft 36 and at its opposite end to a stub shaft 44 parallel to crankshaft 36. A long carriage support arm 46 is rotatably connected at its upper end to stub shaft 44 through a sleeve connection 47. The lower end of support arm 46 is pivotably connected to fixed base 28 by a pivot shaft 48 extending through a journal bearing 49 on the fixed base.

A drive sprocket 50 fixed to crankshaft 36 is connected through a suitable drive chain 52 (FIG. 1) to the output shaft of carriage drive motor 34. Thus, operation of motor 34 rotates crankshaft 36 through chain-and-sprocket drive 50, 52, causing crank arm 43 to rotate about the axis of crankshaft 36, to oscillate support arm 46 on its pivot shaft 48. Oscillation of arm 46 causes saw carriage 20 to oscillate about its pivot connection to base 28, thereby stroking saw blade 10 in an arcuate path toward and away from a log L clamped beside the chop saw. Because of the geometry of the carriage, support arm 46 and interconnecting rotary crank, saw blade 10 is caused to oscillate between its uppermost retracted full-line position and its lowermost phantom line position in an arcuate path as shown in FIG. 1. In FIG. 1, crank arm 43 is shown aligned with support arm 46 but extended therefrom, representing the uppermost position of the saw blade and its carriage. However, in FIG. 3 crank arm 43 is shown aligned with but alongside support arm 46, representing the lowermost position of the saw blade and carriage.

Crankshaft 36 has a cam wheel 54 affixed to it. Cam wheel 54 includes a cam projection 56. A cam follower 58 on the outer end of a valve-actuating link 59 pivoted to carriage 20 engages the periphery of cam wheel 54. When cam follower 58 rides up on cam projection 56 during rotation of crankshaft 36, link 59 operates a carriage motor speed control means to reduce the speed of such motor and thus the speed of travel of carriage 20. In this case the motor speed control comprises a hydraulic flow control or deceleration valve 60 in the hydraulic circuit of motor 34. Such valve when depressed reduces the flow rate of fluid through motor 34 to decrease its speed.

Cam wheel 54 is positioned on crankshaft 36 such that cam projection 56 does not actuate valve 60 to restrict flow through carriage motor 34 until the saw blade 10 begins its cutting stroke through the largest diameter log that the chop saw is designed to handle. For example, if the chop saw is designed to cut logs up to a maximum diameter of 30 inches, depicted by log L in FIG. 1, the feed speed of the saw blade is reduced when the saw begins cutting through the theoretical 30-inch diameter log. In this sense the described means for controlling the speed of hydraulic motor 34 and thus the stroking speed of the saw carriage and blade is responsive to the position of the saw blade or its carriage with respect to the log or other workpiece to be cut, as represented by the position and profile of cam 54 and its projection 56 on crankshaft 36. Cam wheel 54 is also profiled and positioned so that when saw blade 10 reaches the lower end of its cutting stroke in a maximum design diameter log, flow control valve 60 returns to its normal full-flow position to increase the flow rate in the motor circuit and thus the speed of motor 34 to return the saw carriage to its uppermost, starting position at full speed. Therefore, it will be apparent that the carriage is stroked at maximum speed throughout its operating cycle except when the saw blade is cutting through a log of the maximum design diameter.

Cam projection 56 of cam wheel 54 is also preferably profiled so that the slow feed speed of the saw blade while it is cutting is controlled so that the blade cuts through a substantially constant area of wood per unit of time so that the power required to cut through the log remains substantially constant. This means that although the saw blade always moves more slowly when cutting than when not cutting, the feed speed when cutting will vary depending on the position of the saw blade in the log being cut. The feed speed progressively decreases as the saw blade approaches the center of the log and progressively increases as it cuts outwardly from the center of the log. In this way the saw is cycled at a fast speed while conserving the power required to make the cut.

As shown in FIG. 3, a pair of limit switches 62, 63 are mounted on the saw carriage frame and include limit switch actuators 62a, 63a respectively. These limit switches are also designated LS-1 and LS-2 respectively in FIG. 3 and in the electrical control circuit diagram of FIG. 4. Crankshaft 36 carries a pair of switch-operating cams 65, 66 which, through engagement with switch actuators 62a, 63a, control the operation of the limit switches 62, 63. The limit switches are used to coordinate the positions of the saw carriage with the operation of a pair of log-clamping arms 73, 74 and to stop the saw carriage at the end of each sawing cycle, as explained in greater detail below.

A single-acting hydraulic cylinder 68 pivotally mounted to fixed base 28 extends angularly upwardly therefrom and has its piston rod connected to saw carriage frame at 69. The base end of the cylinder is connected to a source of hydraulic pressure fluid. Thus cylinder 68 serves as a counterbalance to the weight of the carriage and its supported components, thereby reducing the power required of motor 34 to move the carriage frame through its operating cycle.

The chop saw has an integral log-clamping means 72 including a pair of opposed log-clamping arm means 73, 74 for gripping the opposite sides of a log L, while it is cut by the saw blade 10. Each clamping arm 73, 74 is separated into a pair of spaced arm sections as shown in FIG. 2 by arm sections 73a, 73b to enable saw blade 10 to move down between the arm sections to cut completely through a log L held by the arms. The inside, log-engaging surface of each arm section is provided with a series of downwardly extending log-gripping teeth 75 which tend to resist rotation of the log in either direction by increasing their bite on the log as it tries to rotate. The arm sections 73a, 73b are fixed to a common pivot shaft 70 having an operating arm 71 connected to the piston rod of the clamp-operating cylinder.

Each arm 73, 74 is mechanically separate from the other and operated by a separate hydraulic clamp cylinder 76, 77, respectively. Each hydraulic clamp cylinder is in its own independent hydraulic circuit 78, 79 controlled by an independently operable three-position solenoid-actuated control valve 80, 81, as will be apparent from the hydraulic circuit diagram of FIG. 5. The two hydraulic clamp circuits are in turn separate from a third hydraulic circuit 82 for the hydraulic carriage drive motor 34 which itself is controlled by a separate solenoid-actuated three-position control valve 84. However, all three hydraulic motors and the counterbalance cylinder 68 are connected to a common pressure fluid supply manifold 86 leading from a common source of pressure fluid (not shown). Also, the three separate fluid motor circuits for the clamp cylinders and carriage drive motor are connected to a common return manifold 88 leading to a fluid reservoir or tank (not shown).

The electrical and hydraulic control circuits function to coordinate the clamping action of the clamping arms 73, 74 with the movement and position of saw carriage 20 so that a log L is clamped in cutting position before the saw blade 10 begins its cutting stroke and is released just after the saw blade 10 clears the cut log on the return stroke of its cutting cycle. Furthermore, it will be apparent from the mechanical and hydraulic independence of the two clamp arms 73, 74 and from their parallel hydraulic connection to a common pressure source that each arm will move under equal pressure independently into engagement with the log L to be clamped. If one clamp arm engages the log before the other, the one arm will wait for the other to "catch up," thereafter maintaining equal pressures on opposite sides of the log until maximum clamping pressure is exerted.

Hydraulic Control Circuit

Figure 5:
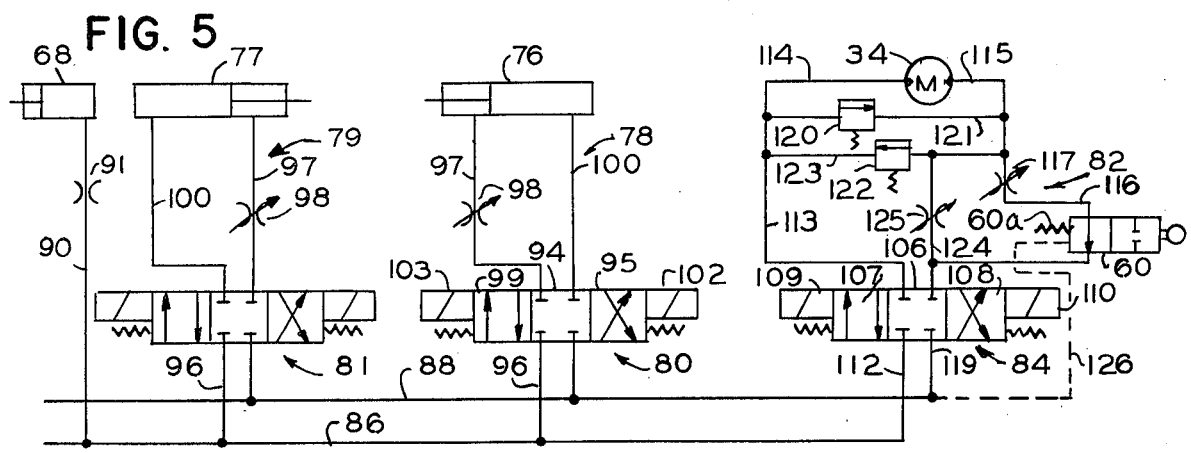
FIG. 5 is a hydraulic circuit diagram of the hydraulic circuits of the invention.

The common fluid supply and return manifolds 86, 88 of the hydraulic circuit in FIG. 5 are housed within the common fixed base 28 supporting both the chop saw carriage and the log-clamping means. Such fixed base also houses the hydraulic valving and circuitry described.

Referring to FIG. 5, counterbalance cylinder 68 is connected to pressure fluid supply manifold 86 by a pressure line 90 which includes flow restriction 91.

The hydraulic circuits of clamp cylinders 76, 77 are identical and will be described therefore only with reference to the circuit for cylinder 76. Each three-position control valve 80, 81 for clamp cylinders 76, 77 in circuits 78, 79 includes a first, spring-centered, neutral flow-blocking position 94. Each such valve also has a second position 95 for directing flow from the pressure fluid supply manifold 86 through a supply line 96 and through the valve and a line 97 having a variable flow restriction 98, to the rod end of the clamping cylinder to retract the cylinder and apply the clamp arm to a log. Each such valve also has a third position 99 which directs flow to the piston end of the cylinder from line 96 and a line 100 to extend the cylinder and release the clamp arm from a log. Each control valve 80, 81 is shifted from its neutral position by valve-operating solenoids including a "close" solenoid 102 and an "open" solenoid 103 in the electrical control circuit. Solenoids 102 when energized shift the valves to their second positions and solenoids 103 when energized shift the valves to their third positions.

Hydraulic circuit 82 for carriage-operating motor 34, as previously noted, includes the three-position directional control valve 84. This valve has a first spring-centered, flow-blocking, neutral position 106, a second "forward" position 107, and a third "reverse" position 108. The valve is moved to its forward and reverse positions by a pair of foward and reverse solenoids 109, 110, respectively, in the electrical control circuit.

In the forward position 107 of control valve 84, fluid flow is from the common fluid pressure supply manifold 86 through a supply line 112 leading through the valve and through lines 113, 114 to the hydraulic motor 34 and then from the motor through return line 115 and parallel lines 116, 124 containing variable flow restrictions 117, 125 and through control valve 84 and a common return line 119 to the fluid return manifold 88 leading back to tank. Return line 116 includes flow control or deceleration valve 60.

Motor circuit 82 also includes a high-pressure relief valve 120 in a line 121 in parallel with motor 34 operable with control valve 84 in its forward position. A second high-pressure relief valve 122 in another line 123 in parallel with motor 34 is operable when control valve 84 is in its reverse position.

Deceleration valve 60 functions to vary the flow rate of fluid through the motor 34 and thus the speed of such motor regardless of whether control valve 84 is in its forward or reverse position. When deceleration valve 60 is depressed by the action of cam projection 56 and its interconnectng linkage, flow through line 116 is reduced or prevented, depending on the cam profile, whereby all or most flow, at a reduced rate, occurs through parallel line 124 and its flow restriction 125, thereby causing motor 34 to operate in its low speed mode. The motor resumes its high speed mode when the cam projection releases the actuator of valve 60, thereby enabling flow through line 116 to resume as flow through line 124 continues.

A drain line 126 drains fluid from deceleration valve 60 to the return fluid manifold 88. A similar drain line (not shown) drains fluid from motor 34 to return manifold 88.

Electrical Control Circuit

Figure 4:
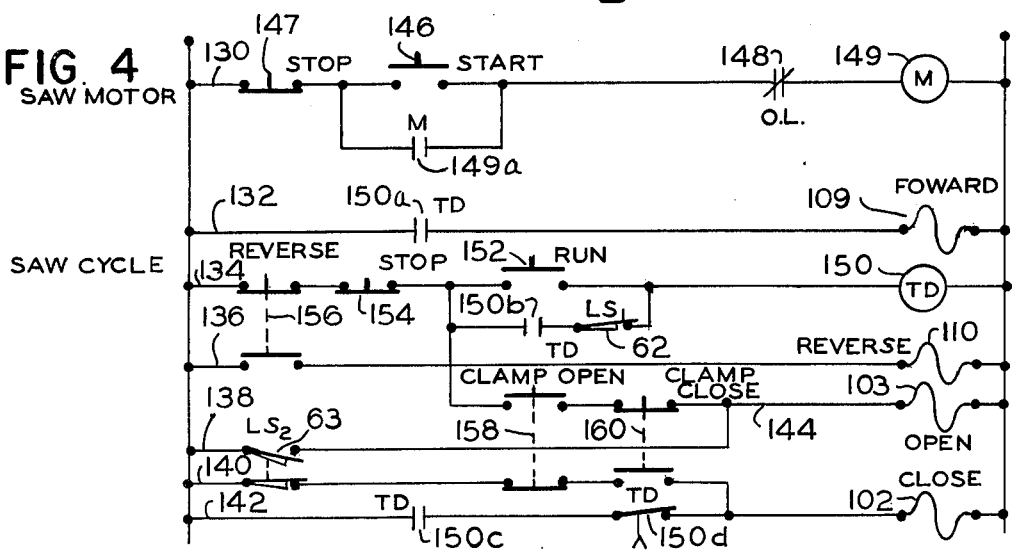
FIG. 4 is an electrical circuit diagram of the control circuit of the invention.

The electrical control circuit of FIG. 4 includes a saw motor circuit represented by line 130, a saw carriage cycling circuit represented by lines 132, 134 and 136, and a log clamp operating circuit represented by lines 138, 140, 142, and 144.

The saw motor circuit includes the manual pushbutton start switch 146, the manual pushbutton stop switch 147, a normally closed overload contact 148, and the saw motor-operating relay 149 having a normally open relay contact 149a in parallel with start switch 146 to maintain the circuit closed after start switch 146 is depressed and released.

Line 132 of the saw cycling circuit includes a normally open time delay relay contact 150a which is closed to energize forward solenoid 109 of the carriage motor control valve 84 when a time delay relay 150 in line 134 is energized.

Time delay relay 150 also includes a normally open contact 150b in parallel with a manually operated run switch 152 in line 134 to maintain the circuit closed after the run switch is depressed and released. The relay 150 also has a normally open relay contact 150c in line 142 of the log clamp circuit. A normally closed time delay-operated relay contact 150d is also provided in line 142. Such contact opens following a predetermined time delay after relay 150 is energized to de-energize close solenoids 102 and return clamp control valves 80, 81 to their neutral positions, thereby locking the clamp arms in their clamping positions.

Line 134 also includes a manually operable stop switch 154 and one contact of a manually operable double pole reversing switch 156, the other contact of which is in line 136. When reversing switch 156 is depressed, it breaks circuit 134 to de-energize relay 150 and thus the forward solenoid 109 in line 132 and simultaneously makes circuit 136 to energize reverse solenoid 110 of control valve 84 to reverse the hydraulic motor 34. This reversing function is used to back the saw blade out of a log when an obstruction is encountered. This avoids possible damage to the saw and the need to cut entirely through the log before retracting the saw blade from the cut.

Line 144 of the log-clamping circuit is connected to line 134 of the saw cycle circuit and includes the open solenoids 103 of clamp control valves 80, 81. Line 144 also includes a normally open contact of a double pole manual clamp open switch 158. Such switch has a normally closed contact in line 140. Line 144 also includes a normally closed contact of a double pole manual clamp close switch 160. This switch has a normally open contact in line 140. Line 140 is connected to line 142 so that when the contact of clamp open switch 158 in line 144 is closed by depressing such switch to activate the open solenoids 103, the other contact of the same switch 158 in line 140 opens to simultaneously deactivate the close solenoid 102. Similarly, when the contact of clamp close switch 160 in line 144 is opened by depressing such switch to deactivate the open solenoids 103, the other contact of switch 160 in line 140 is closed to activate the close solenoids 102 in line 142. Thus the log clamps can be manually applied to and released from a log as well as automatically operated in a manner described below.

Line 138 is connected to line 144 through a normally open contact of the double pole LS-2 limit switch 63. The LS-2 limit switch also has a normally closed contact in line 140. When the LS-2 switch contact closes in line 138, it energizes the open solenoids 103 in line 144 and at the same time opens its contact in line 140 to prevent manual activation of the close solenoids 102.

The LS-1 limit switch 62 is connected to line 134 in parallel with run switch 152 and in series with relay contact 150b. This limit switch is used to de-energize time delay relay 150 at the end of a carriage cycle to stop the carriage at its upper limit position. When relay 150 is de-energized, its relay contact 150a opens to deactivate the forward solenoid 109, thereby returning the carriage motor control valve 84 to its neutral position to stop carraige drive motor 34.

Operation

The described chop saw operates as follows, assuming a log L is positioned for cutting on a conveyor (not shown) below the chop saw blade. The desired position of a log for sectioning is determined automatically or by an operator at conveyor controls (not shown) which form no part of the present invention. During the time that logs L are moved along the conveyor, the saw blade may be rotating continuously in readiness for sawing. To start the saw blade rotating, the operator presses start switch 146, momentarily closing the circuit 130 of motor-operating relay 149, thereby closing the holding-in relay contact 149a to maintain motor relay 149 energized and the saw motor operating after the start switch is released. Thereafter the saw motor continues to operate and rotate saw blade 10 until stop switch 147 is depressed.

With the log positioned for sectioning, the operator depresses run button 152 in circuit 134 to energize relay 150 and start the carriage in its downward travel toward the log. As soon as carriage 20 starts to move, cam 65 on the rotary crank closes limit switch LS-1, thereby permitting release of the run switch. The circuit 134 of relay 150 remains closed through relay contact 150b and the LS-1 limit switch. Thus relay contact 150a in line 132 remains closed to keep forward solenoid 109 energized and carriage motor 34 operating in its forward mode. The saw carriage therefore continues its downward movement toward log L through the action of rotary crank 32.

When time delay relay 150 is energized, it also closes relay contact 150c in line 142, thereby energizing close solenoids 102, causing clamp arms 73, 74 to begin to move toward the log.

As saw blade 10 approaches log L at full speed, clamp arms 73, 74 exert their maximum pressure against the log L through retraction of clamp cylinders 76, 77. At this point, time delay relay 150 times out, causing the time delay contact 150d in line 142 to open. This de-energizes the close solenoids 102, causing clamp control valves 80, 81 to return to their centered neutral positions, blocking flow to and from clamp cylinder circuits 78, 79 and thereby locking the cylinders 76, 77 in their retracted positions and locking clamp arms 73, 74 against the log under maximum pressure as saw blade 10 cuts through the log.

At about the same time, just before saw blade 10 begins cutting through the log, the cam wheel 54 on crankshaft 36 is rotated to a point where cam projection 56 actuates flow control valve 60 in the hydraulic circuit 82 of carriage drive motor 34. This reduces the rate of flow of hydraulic fluid through the motor circuit, causing the speed of motor 34 to shift into its low-speed range as the saw blade cuts through the log. The cam projection 56 is profiled so that the saw blade cuts through a substantially constant area of the log per unit of time so that the power required remains substantially constant during the cutting stroke of the saw blade.

At the end of the saw blade's cutting stroke, which is at the lower limit of travel of saw carriage 20, the cam projection 56 clears cam follower 58 to enable flow control valve 60 to return to its full open position shown in FIG. 5 under the action of a return spring 60a, thereby increasing the flow rate of fluid through the hydraulic circuit and returning hydraulic motor 34 to its high speed mode. Thus saw carriage 20 returns to its upper limit position at full speed.

Just after saw blade 10 clears the log on the upstroke of the carriage 20, cam 66 on crankshaft 36 operates the LS-2 limit switch 63 to close its switch contact in line 138 and open its switch contact in line 140. This activates the open solenoids 103 to shift clamp control valves 80, 81 to their open positions, extending clamp cylinders 76, 77 and opening clamp arms 73, 74 to release the log.

As saw carriage 20 reaches its upper limit of travel, cam 65 on crankshaft 36 operates the LS-1 limit switch 62, causing such switch to open and de-energize time delay relay 150. This opens the relay contact 150a in line 132 to deactivate forward solenoid 109 and return carriage motor control valve 84 to its spring-centered neutral position 106 to stop motor 34. Carriage 20 is thus stopped in its upper limit position, ready for its next operating cycle.

As previously mentiond, carriage drive motor 34 is provided with reversing capability to back the saw blade 10 out of a log if necessary before completing its cutting stroke. To accomplish this, reverse switch 156 is depressed, opening switch contact in line 134 and closing switch contact in line 136. This de-energizes time delay relay 150 to deactivate forward solenoid 109 and simultaneously activates reverse solenoid 110 to reverse the flow of fluid in the circuit of motor 34. The motor reverses, reversing rotation of the rotary crank mechanism and the travel of saw carriage 20, withdrawing saw blade 10 from the log.

A prototype of the described chop saw is designed to section logs having a maximum 30-inch diameter. The saw blade has a 78-inch outside diameter and the saw motor is a 100 horsepower electric motor designed to operate at 1200 rpm and rotate the saw blade at a rim speed of 14,062 feet per minute. The described carriage drive means provides the saw carriage with a cycle time of approximately 3½ seconds.

Having illustrated and described what is presently a preferred embodiment of the invention, it should be apparent to those persons skilled in the art that the same permits of modification in arrangement, detail, size, capacity and application. We claim as our invention all such modifications as come within the true spirit and scope of the following claims.

We claim:
1. A chop saw comprising:
a powered saw blade,
a saw carriage means supporting said saw blade and mounted for moving said blade toward and away from a workpiece,
carriage drive means for moving said carriage means to feed said saw blade toward and away from and in a cutting stroke through said workpiece,
and position-responsive speed control means responsive to the position of said carriage means with respect to said workpiece for reducing the feed speed of said carriage means during the cutting stroke of said saw blade,
a pair of clamping arm means for gripping opposite sides of a generally cylindrical workpiece during the cutting stroke of said saw blade, a pair of separate and independent hydraulic motors, one for operating each said clamping arm means, each said hydraulic motor being in a separate hydraulic control circuit, each said control circuit including a three-position control valve having a first spring-centered flow-blocking position, a second position for directing flow to said hydraulic motor in a direction to apply said clamp arm means and a third position for directing flow to said hydraulic motor in a direction to release said clamp arm means, and valve-operating means operable sequentially first during movement of said saw blade toward a workpiece to shift said control valve from said first position to said second position to apply said clamping arm means to the workpiece prior to commencement of said cutting stroke, second to shift said control valve from said second position back to said first position to block flow and thereby lock said clamp arm means on the workpiece during said cutting stroke and third to shift said control valve from said first position to said third position to release said workpiece after completion of said cutting stroke.

2. A chop saw comprising:
a powered saw blade,
a saw carriage means supporting said saw blade and mounted for moving said blade toward and away from a workpiece,
carriage drive means for moving said carriage means to feed said saw blade toward and away from and in a cutting stroke through said workpiece,
and position-responsive speed control means directly responsive to an operating position of said carriage drive means and operated by operating means associated with said carriage valve means for varying the feed speed of said carriage means during the cutting stroke of said saw blade,
log clamp means for clamping a log in a fixed position during said cutting stroke, said clamp means including a pair of opposed independently movable log-clamping arm means for gripping the opposite sides of said log adjacent to the cutting plane of said saw blade, and control means for automatically cycling said carriage drive means and said clamping arm means in sequence such that said clamping arm means grip said log before said saw blade begins its cutting stroke and release said log upon completion of said cutting stroke, said control means including clamp release means on said saw carriage means operable in response to movement of said carriage means to a predetermined retracted position to release said log-clamping arm means.

3. Apparatus according to claim 2 wherein each said log-clamping arm means and said carriage drive means are operated by separate and independently operable hydraulic motor means supplied by hydraulic pressure fluid from a common hydraulic pressure fluid manifold within a common fixed base support for said saw carriage and clamp means.

4. Apparatus according to claim 2 wherein each said clamping arm means includes a series of workpiece-gripping teeth extending generally downwardly along the workpiece-engaging surface thereof when said arm means is in a generally upright position such that when said arm means is in gripping engagement with said workpiece, said teeth tend to bite into said workpiece to resist rotation thereof.

5. In a chop saw apparatus for cutting logs into variable lengths including a rotatable circular saw blade movable into and retractable from cutting engagement with a log by an oscillating saw carriage pivoted to a fixed base,
  a log-clamping means including a pair of separate and opposed log-clamping arms for gripping the opposite sides of a log while being cut by said saw blade,
  reversible fluid motor means for moving each log-clamping arm separately into clamping engagement with a log,
  and control means operable automatically to coordinate stroking movement of said saw carriage with clamping movement of said clamp arms such that said clamp arms grip a log before said saw blade begins cutting said log and release said log after withdrawal of said saw blade therefrom,
  said control means including fluid control circuit means for said fluid motor means and fluid control valve means in said circuit means, said control valve means being movable to a first position to cause said fluid motor means to close said arms against a log before said saw blade enters said log, said control valve means being movable to a second position to cause said fluid motor means to open said arms and release said log in response to movement of said saw blade away from said log to a predetermined retracted position.

6. Apparatus according to claim 3 wherein said control means includes means operable automatically to lock said clamp arms in clamping engagement with a log as said saw blade cuts through said log, said automatically operable means including said control valve means and means operable to move said control valve means from said first position to a third position blocking fluid flow to and from said fluid motor means when said clamp arms exert clamping pressure on a log.

7. Apparatus according to claim 5 including means mounting said clamp arms on said fixed base for pivotal movement toward and away from a log to be clamped.

8. Apparatus according to claim 7 wherein each said arm includes a pair of arm sections spaced apart on a common pivot shaft, said saw blade having a vertical cutting plane passing through the space between each said pair of arm sections, so that said saw blade passes downwardly between said arm sections when cutting through a log.

9. In a chop saw apparatus for cutting elongate workpieces into variable lengths including a rotatable circular saw blade movable into and retractable from cutting engagement with a workpiece by an oscillating saw carriage pivoted to a fixed base,
  a clamping means including a pair of separate and opposed clamping arms for gripping the opposite sides of a workpiece while being cut by said saw blade,
  a pair of reversible fluid motor means, one for moving each clamping arm separately into clamping engagement with the workpiece,
  and control means operable automatically to coordinate stroking movement of said saw carriage with clamping movement of said clamp arms such that said clamp arms grip the workpiece before said saw blade begins cutting the workpiece and releases the workpiece after withdrawal of said saw blade therefrom,
  said control means including a separate fluid control circuit for each said fluid motor means, each said control circuit including a control valve movable between three positions including a flow-blocking position, a clamp-closing position and a clamp-opening position, and control valve-operating means operable sequentially, first to move each control valve from its flow-blocking position to its clamp-closing position to apply clamping pressure to the workpiece before said saw blade enters the workpiece, second to move each control valve from its clamp-closing position to its flow-blocking position while said clamp arms apply clamping pressure to the workpiece to lock said clamp arms on the workpiece during the cutting stroke of the saw blade, and third to move each control valve from its flow-blocking position to its clamp-opening position to release the workpiece after the saw blade has completed its cutting stroke.

10. Apparatus according to claim 9 wherein said control valve-operating means includes position-responsive means operable in response to movement of said saw carriage to a predetermined retracted position to move each said control valve from its flow-blocking position locking said clamp arms on the workpiece to its clamp-opening position to release the workpiece.

* * * * *

UNITED STATES PATENT OFFICE
CERTIFICATE OF CORRECTION

PATENT NO. : 4,031,788
DATED : June 28, 1977
INVENTOR(S) : Dallas F. Boge and Roderick Olsen It is certified that error appears in the above-identified patent and that said Letters Patent are hereby corrected as shown below:

Column 2, line 60, "casue" should be --cause--;
Column 8, line 29, "carraige" should be --carriage--;
Column 9, line 49, "mentiond" should be --mentioned--;
Claim 2, column 10, line 59, "valve" should be --drive--;
Claim 6, column 11, line 54, "claim 3" should be --claim 5--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks